Oct. 19, 1943.     G. FAST     2,332,068
COUPLING
Filed Feb. 10, 1941     4 Sheets-Sheet 1

INVENTOR.
GUSTAVE FAST
BY
ATTORNEY.

Oct. 19, 1943.　　　　G. FAST　　　　2,332,068
COUPLING
Filed Feb. 10, 1941　　　4 Sheets-Sheet 3

INVENTOR.
GUSTAVE FAST
BY
ATTORNEY.

Oct. 19, 1943.   G. FAST   2,332,068
COUPLING
Filed Feb. 10, 1941   4 Sheets-Sheet 4

INVENTOR.
GUSTAVE FAST
BY
ATTORNEY.

Patented Oct. 19, 1943

2,332,068

UNITED STATES PATENT OFFICE 2,332,068

COUPLING

Gustave Fast, Annapolis, Md., assignor of one-half to Christiane Ganna Fast, Annapolis, Md.

Application February 10, 1941, Serial No. 378,155

26 Claims. (Cl. 64—9)

This invention relates to couplings and more particularly to shaft couplings of that type which compensates for misalignment of the connected shafts or devices, such as described in my Reissue Patent No. 15,177 granted August 16, 1921. It embodies various improvements and novel features in couplings of that character. The present construction is adapted to compensate for greater misalignment than that of said reissue patent due to the improved distribution of the load over the load-carrying surfaces in transmitting the same from the driving to the driven member.

In couplings of the type to which this invention is directed, a lubricant film should be maintained between the load-carrying surfaces. This serves to prevent direct metal-to-metal contact and wear and also to lessen the frictional resistance to relative longitudinal movement of the connected members. As these films are very thin, it is desirable that as large a percentage as possible of the mating load-carrying surfaces be in sufficiently close proximity to each other to share in the transmission of the load, in order to prevent concentration of the load on a few projections or surfaces of small area which would result in breakdown of the lubricant films with consequent metallic contact and high frictional resistance to longitudinal movements.

An object of the invention has been to provide a coupling in which the load is transmitted through surfaces of relatively large area so as to enable a construction of given size to transmit heavier loads than usual, without danger of metal-to-metal contact. This is accomplished, in part, in a preferred form of the invention, by providing torque transmitting means, in the form of a sleeve, or plurality of sleeves, or the like, capable of yielding in a lateral or radial direction under load to bring surfaces of a greater combined area into load transmitting relation than is possible in a rigid structure.

Another object of the invention has been to produce a coupling having simple and inexpensive, but effective, provisions for dampening torsional vibrations.

A further object of the invention has been the provision of a simple and convenient lubricant filling means and the efficient retention of the lubricant within the coupling which is necessary to prevent wear of the load-carrying surfaces. When couplings of my earlier type, disclosed in said reissue patent, have failed, the failure has almost invariably been caused by the loss of lubricant either through the lubricant filling means, which is subjected to the centrifugal pressure of the lubricant, or past the paper gasket between the coupling sleeve flanges after this has been subjected for some time to the torque load from the driving to the driven member. In my improved coupling I have, therefore, eliminated the transmission of the torque through the flanges or clamp rings of the lubricant retaining casing. A fortunately rare but nevertheless annoying source of lubricant escape in prior couplings is found at the coupling ends between the sleeves and the shaft hubs when the coupling is subjected to torsional vibrations or reversal of torque in reciprocating machinery. The rapid reversal of the load on the load-carrying surfaces produces violent splashing of the lubricant which then finds its way out of the coupling at the ends.

Another object of the invention has been to provide a greater lubricant capacity of the coupling than has heretofore been possible in earlier types. This has been accomplished through the use of an absorbent lubricant reservoir placed inside and revolving with the coupling.

A further object of the invention has been to provide a simple torque limiting means whereby the driving and driven members will become disconnected when the transmitted torque becomes excessive.

A feature of the invention is the construction of the entire coupling from simple, inexpensive forms of stock capable of large-scale and economical production. Thus the casing may advantageously be made from metal stampings, certain torque transmitting sleeves from metal tubing, certain clamp rings from rolled forgings, and the hubs from bar stock or drop forgings.

The improved coupling is compact and of even smaller dimensions than existing couplings intended for the same duty while at the same time it accommodates larger shafts.

Other objects, features and advantages of the invention will appear from the illustrative examples of the same, which will now be described in conjunction with the accompanying drawings, in which.

Figures 1, 2, 3, 4, 5:
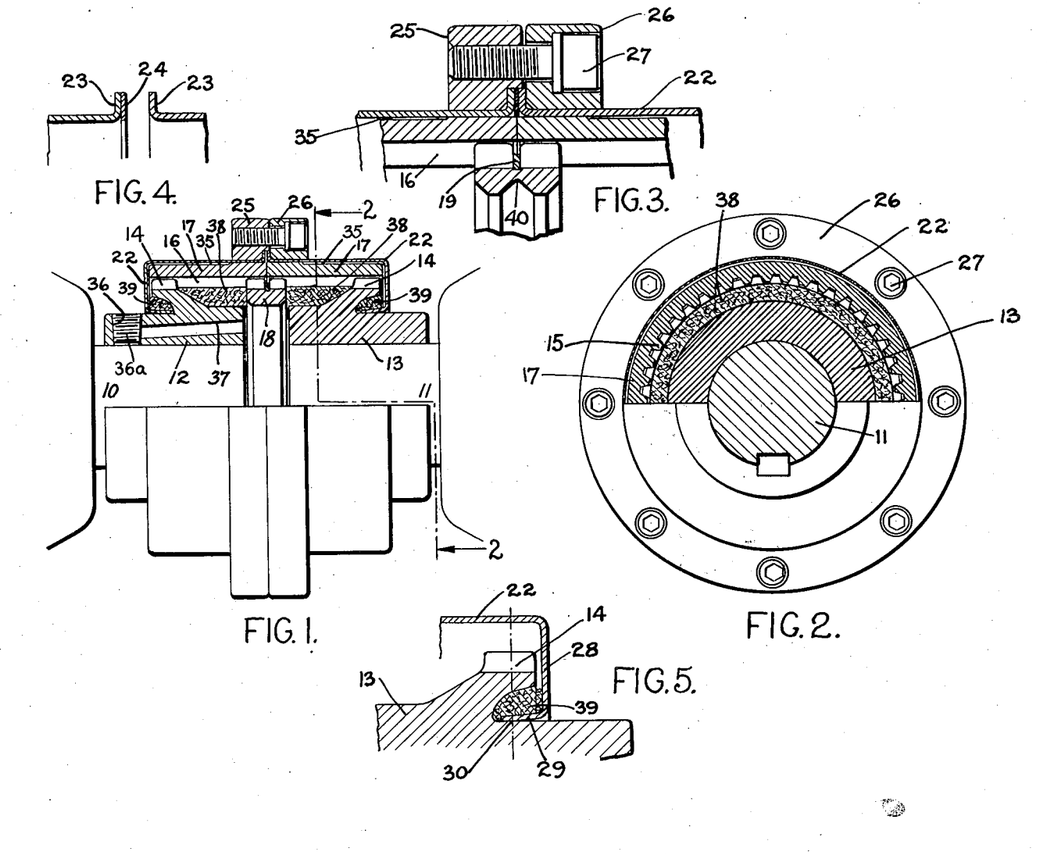
Fig. 1 is in its upper part a vertical, longitudinal, axial section through a coupling unit embodying features of the invention and in its lower part a longitudinal elevation of the same.
Fig. 2 is a transverse vertical section through the unit along the line 2—2 of Fig. 1.
Fig. 3 is an enlarged, axial sectional view through a portion of the coupling showing a modification embodying overload releasing means.
Fig. 4 is an enlarged sectional view showing in detail the gasket arrangement between the flanges of the lubricant retaining casing, these flanges being shown spaced apart.
Fig. 5 is an enlarged sectional view showing in detail lubricant and dust sealing means between the lubricant retaining casing and an undercut portion of the hub.

Referring now to the drawings, the invention has been illustrated in Figs. 1 and 2 as applied to a torsionally rigid coupling having laterally yieldable or flexible sleeves. By "torsionally rigid" is here meant a coupling having a relatively small angle of twist due to the torque passing through its various members and by "torsionally elastic" is meant a coupling having a relatively large angle of twist from the same cause.

Figure 6:
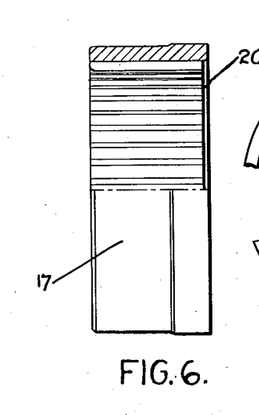
Fig. 6 illustrates a torsionally rigid type of narrow sleeve constructed in accordance with the invention, the upper half being in section and the lower half being in elevation.
Figure 9A:
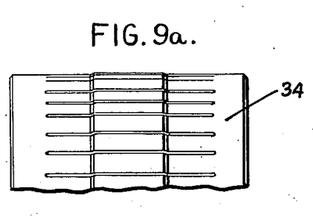
Fig. 9a is a longitudinal elevation of a portion of a torsionally elastic wide sleeve.
Figure 9B:
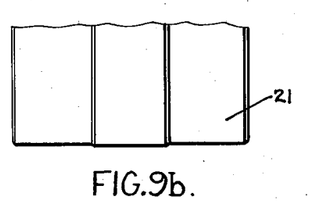
Fig. 9b is a longitudinal elevation of a portion of a torsionally rigid sleeve.

In connecting two members 10 and 11, shafts or other rotating parts of the connected devices that are for some reason misaligned, i. e., out of direct axial alignment, two hubs 12 and 13 are mounted in any suitable manner on their respective members or may form integral parts thereof. Each hub has a series of load-carrying surfaces 14 forming parts of jaws, gear teeth, splines or other suitable forms of projections. Meshing with these projections are internal projections 15 having surfaces 16 preferably generated to the same curvature as surfaces 14 and forming part of aligned sleeves 17. These sleeves are formed without any flanged parts which would make them stiff and resistant to changes in a lateral direction and are therefore readily deformable laterally. Two narrow sleeves 17 are preferably used, as shown, connected by means of an externally splined lock ring 18 equipped with a snap ring 19 fitting in recesses 20 formed at the ends of the projections 15 of the sleeves (Fig. 6). The snap ring serves to control the longitudinal position of the lock ring and thus maintain its proper engagement with the internal projections of the connected sleeves. In place of the two sleeves and lock ring, one single sleeve 21 may be used as shown in Fig. 9b. However, two sleeves will ordinarily be preferable to one since they may flex laterally in different radial planes independently of each other. Moreover, the use of two sleeves will facilitate erection of the connected machines and will give access more readily for the purpose of checking the alignment or misalignment of the hubs.

Surrounding the hubs and sleeves is a lubricant-holding casing 22 preferably made in two parts joined together at flanged portions 23 having between them a gasket 24 (Fig. 4) formed of plastic or semi-plastic material, such as fiber or tinned copper of proper hardness, or the like. The gasket may be permanently fastened to one of the flanged portions by solder, synthetic resin, or other suitable means. The joint is held together by means of two clamp rings 25 and 26 pressed together by means of bolts or screws 27. In this manner an excellent fluid-tight joint is secured which will prevent the escape of lubricant even under extremely high pressures. The two flanges 23 and the gasket 24 fit into a recess or rabbet formed in clamp ring 25 and the concentricity of the two casing parts 22 is thus insured. The depth of the recess in an axail direction is somewhat less than the combined thickness of the flanges and gasket so as to provide the desired squeezing action by the clamp rings.

The outer ends of the casing have radial walls 28 terminating in inwardly extending tapered parts 29 forming metallic seals with hubs 12 and 13. The sealing portions of the parts 29 are confined to narrow cylindrical sections 30 located on lines approximately bisecting the width of the load-carrying surfaces 14; this serves to minimize the relative movement between the contacting surfaces on the hubs 12 and 13 and the casing 22 when the coupling operates in a misaligned position. The coupling thus far described has been of the "torsionally rigid" type.

Figures 7A, 7B, 8:
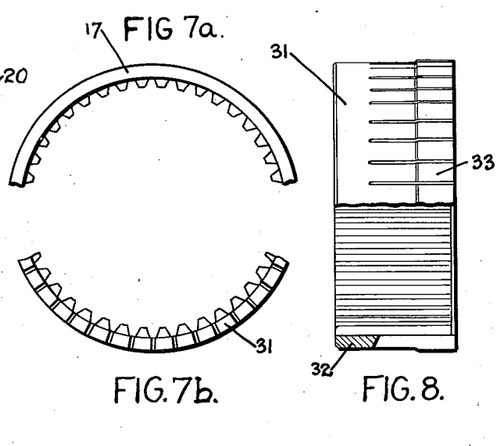
Fig. 7a is an end view of a portion of the sleeve shown in Fig. 6.
Fig. 7b is an end view of a portion of a modified sleeve.
Fig. 8 is a view partly in longitudinal vertical section and partly in side elevation of the sleeve of Fig. 7b.

In order to produce a coupling having torsional elasticity the same parts described may be used with but slight modifications. Thus, the torsionally rigid sleeves 17 may be transformed into torsionally elastic sleeves 31 (Fig. 8) by cutting slots between the splines for a portion of their length. Each sleeve is thus transformed into a narrow annular ring portion 32 having extending from its side toward the center of the coupling a series of elastic cantilevers or splined bars 33 engaging the lock ring 18 at their extreme end portions. As in the case of the torsionally rigid type coupling, one sleeve 34 may be used in place of the two sleeves 31.

Figure 10:
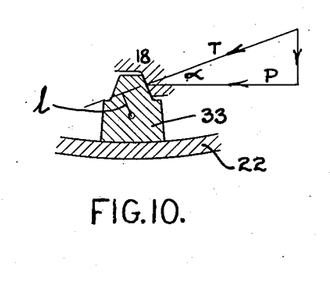
Fig. 10 is an enlarged sectional view showing in detail the engaging surfaces of a spline on a lock sleeve and an elastic spline forming part of a torsionally elastic sleeve and includes a diagram indicating the forces acting between said splines.
Figure 11:
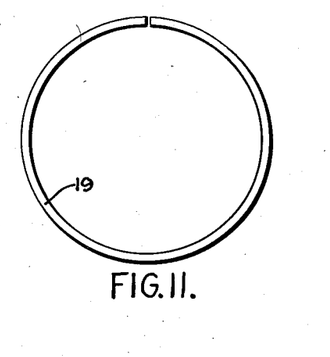
Fig. 11 is a side elevation of a snap ring for locating the lock sleeve in a fixed longitudinal position relative to the narrow torque transmitting sleeves when connecting them.

When the coupling is subjected to a torque load, it is apparent that the cantilevers will be subjected to a bending moment, the magnitude of which is determined by the tangential force P (Fig. 10) and the length of the cantilever but in addition to this there is torsion in the cantilevers due to the fact that the resulting force $$T = \frac{P}{\cos \alpha}$$

does not pass through the center of gravity of the cantilever section. If $\alpha$=pressure angle of the load-carrying surfaces and $l$=perpendicular distance from the center of gravity of the section to the line of the resultant force T, then the twisting moment is=

$$\frac{P}{\cos \alpha} \times l$$

the combined effect of bending and twisting of the cantilevers or elastic bars is such that an appreciable and sufficient deflection is secured to provide a desired resilience in the drive without subjecting the cantilevers to a stress high enough to produce permanent distortion or fatigue.

The sleeves whether torsionally rigid as 17 and 21 or elastic as 31 and 34 fit the casing 22 only for a portion of their length located near the center of the coupling directly within the clamping rings 25 and 26. The rest of their length has a slightly reduced diameter in order to provide clearance 35 between the casing and the sleeves so that their outer ends, through which the load is transferred to and from the hubs, will not be restrained in their lateral flexibility and will thus be free to produce improved load distribution with their mating hubs.

When couplings of this type, having splines or gear teeth for load-carrying surfaces and having engaging sleeves as well as hubs which are laterally rigid, i. e., that offer great resistance to change in their transverse geometrical configuration, are subjected to torque loads under a condition of misalignment, contact occurs only at two engaging pairs of load-carrying surfaces 180° apart, as pointed out in my Patent No. 1,641,669 granted to me September 6, 1927.

Couplings of this type heretofore constructed have been lacking in lateral flexibility or ability of relative radial adjustment of the load-carrying surfaces. This lateral rigidity is due to the heavy radial flanges which are provided on the casings or sleeves of prior couplings for transmission of the torque and due to the end closures which are provided on these casings for retaining the lubricant, these casings themselves being equipped with load-carrying surfaces through which the torque is transmitted. In some instances the rigidity has been the result of using crowned teeth engaging the bottom of the tooth spaces of the mating member without appreciable radial clearance which precludes the possibility of relative lateral adjustment between the members.

It will therefore be understood that as a prerequisite for the proper functioning of the present invention the splines or teeth must have sufficient radial clearances to permit relative radial or lateral adjustment of the engaging members and their load-carrying surfaces.

Figure 12:
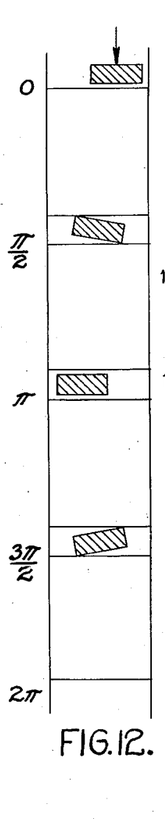
Fig. 12 is a diagrammatic developed view, related to Figs. 13 and 14, showing the relative positions of the load-carrying surfaces when a coupling having a laterally rigid sleeve is misaligned.
Figures 13, 14:
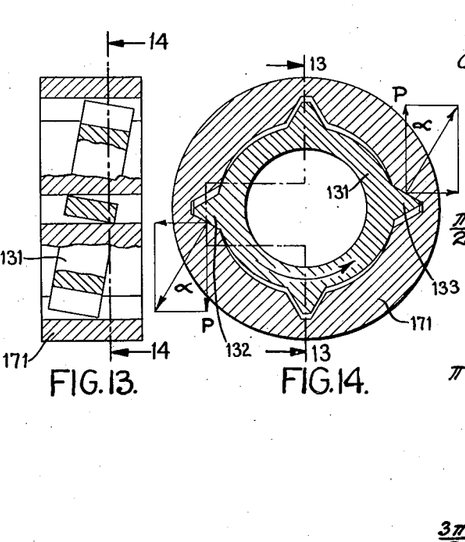
Fig. 13 is a schematic view in section through the hub and sleeve of a coupling, taken along the broken line 13—13 of Fig. 14, for the purpose of illustrating the contact conditions of the load-carrying surfaces.
Fig. 14 is a schematic, transverse sectional view through a hub and laterally rigid sleeve, taken along the line 14—14 of Fig. 13, showing the contacts of the load-carrying surfaces.

In order to clearly illustrate this point I have prepared several diagrammatic or schematic views (Figs. 12 to 16, inclusive). Fig. 13 is a section through the load-carrying surfaces in a coupling having 4 splines. It is taken on the line 13—13 of Fig. 14. Fig. 14 is a transverse section through the coupling and is taken on the line 14—14 of Fig. 13. Assuming that the members are laterally rigid, the sleeve 171 will remain of circular shape but the hub 131 in the same transverse plane is of an elliptical shape, thus contacting the sleeve at only two of the splines, 132 and 133, which are on the major axis of the ellipse. A developed view showing the contacting conditions of the load-carrying surfaces involved in Figs. 13 and 14 is shown in Fig. 12. Contact can only be had at $\pi/2$ and $3\pi/2$.

Figures 15, 16:
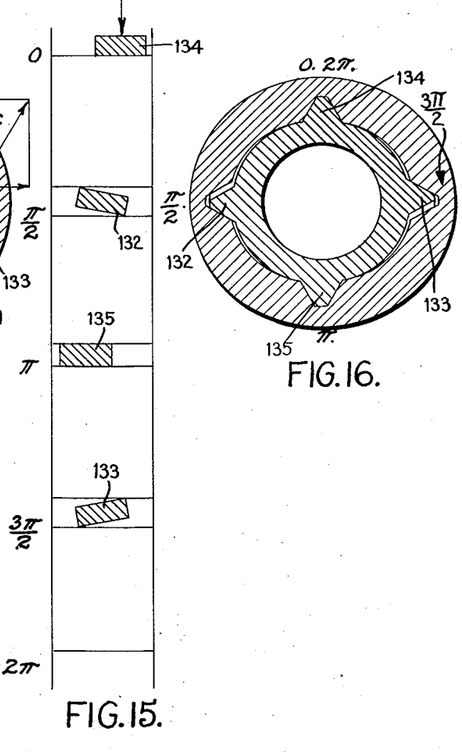
Fig. 15 is a diagrammatic developed view, related to Fig. 16, showing the relative positions of the load-carrying surfaces when a coupling having a laterally flexible sleeve is misaligned.
Fig. 16 is a schematic, transverse sectional view showing the contacts of the load-carrying surfaces in a laterally flexible sleeve.

Fig. 16 is a view similar to Fig. 14 except that the sleeve is here assumed to be laterally flexible. Due to the obliquity of the resultant forces between the load-carrying surfaces at the projections 132 and 133 there are radial components at these points equal to $P \tan \alpha$, where P is the tangential force and $\alpha$ the pressure angle. These radial forces will flex or change the shape of the sleeve from circular to elliptical and make it conform to the transverse elliptical section of the hub. If the torque load is sufficient, the sleeve will distort to a point where it will engage the projections 134 and 135 so that all of the mating surfaces will make contact. This condition is illustrated in Figs. 15 and 16.

While the pressure angle $\alpha$ may be varied considerably to suit particular circumstances, for optimum engagement conditions, I have found that an angle of from 20° to 30° is the most desirable.

In any revolving mechanism subject to rotational impulses of a periodic nature it is well known that critical torsional vibrations may occur when the frequency of the impressed forces or impulses harmonizes with the natural frequency of torsional vibrations of such a system. Such critical vibrations are extremely dangerous to any mechanism. One method of damping out such vibrations has been disclosed in my Patent No. 2,021,718.

It is known that if a part of a revolving mass subject to torsional vibrations can be disconnected from the main mass it will go out of step with the vibrations of the main mass and thus disharmonize the vibrations of the main system. Use of this principle is made in the present invention since the lubricant-holding casing 22, together with the clamp rings 25 and 26 and the screws 27, forms such a separate mass that is free to rotate relative to and independently of the main parts of the coupling such as the hubs 12 and 13, the sleeves 17 and the lock ring 18. There is no positive connection between the two groups of parts. Only friction tends to cause them to rotate together and this frictional force may be adjusted by the fit of the parts, thus providing an advantageous control over the slip and damping effect. The mass of the detached and relatively sliding group of parts may also be varied at will by making the clamp rings heavier to form flywheels having any desired mass.

Several means have been provided heretofore for filling the coupling with a lubricant. The one most commonly used has been to drill and thread a hole in the coupling flange or sleeve through which the lubricant may be introduced. A threaded plug or screw with a gasket is then inserted to prevent the escape of the lubricant when the coupling is revolving. Calculations show that at high speed a pressure in excess of 100 pounds per square inch may be generated in the coupling due to centrifugal force acting on the lubricant. As stated before, almost every failure of couplings constructed in accordance with my prior inventions is traceable to the escape of lubricant through the filling aperture due to ineffective means of closure.

In the present invention I have provided readily accessible lubricant filling means and closure thereof which are out of contact with the lubricant when the coupling is revolving; in fact, it is so arranged that when the coupling is in operation, centrifugal force will serve to withdraw or expel the lubricant from contact with the seal or closure of the lubricant filling aperture.

To accomplish this I introduce the lubricant through one of the hubs 12 by providing an extension of the hub to a point beyond the casing 22. An approximately radial hole 36 is drilled and threaded part or all the way through the extended hub portion and communicating therewith is a substantially axial or longitudinal passage 37 terminating at the face of the hub inside of the coupling. This passage 37 is preferably slightly inclined outwardly in a radial direction from the outer to the inner end thereof so that any lubricant left in this passage, after filling the coupling with the needed amount of lubricant, is expelled therefrom by centrifugal force when the coupling is rotated. The hole or passage 36 is provided with a suitable closure such as a pipe plug 36a, inserted after the coupling has been filled, for the purpose of excluding foreign matter and for retaining the lubricant against discharge by gravity in the event that the coupling should come to rest with the plug below the axis of the coupling.

As the presence of an ample quantity of lubricant at all times, sufficient to submerge the load-carrying surfaces when the coupling rotates, is imperative to prevent wear in couplings of this general type, provision has been made for additional lubricant storage capacity over that heretofore provided.

In prior couplings of this type the maximum quantity of lubricant which the coupling could retain would occupy only a segmental space up to the lowermost point on the seal which extends around the shaft. This, in the present construction, would be up to the lowermost point on sealing portion 30 (Fig. 5) of casing 22 on the underside of the connected shafts. In order to increase this capacity I have provided an absorbent oil reservoir 38 in the interior of the coupling capable of revolving with it, this reservoir being of a suitable material such as felt or other highly absorbent matter. When the coupling is filled with a lubricant, in addition to filling the segmental space previously mentioned, this absorbent reservoir becomes saturated due to capillary action.

It is thus possible to provide several times the quantity of lubricant ordinarily provided in previous constructions. When the coupling is in motion centrifugal force discharges the lubricant from the absorbent reservoir and delivers it to the circumferentially extending space in the region of the load-carrying surfaces and when the coupling comes to rest, the reservoir reabsorbs the lubricant.

In connection with couplings subject to torsional vibrations or rapid reversals of torque, violent splashing takes place as the load is changed from one side of the teeth to the other. The splashing is frequently so violent that the lubricant would ordinarily escape past the seal 30 between the casing 22 and the hubs 12 and 13. In order to prevent this an absorbent fabric seal such as felt 39 (Fig. 5) or other suitable material may be placed in recesses formed in the hubs or between the hubs and the casing 22. This seal baffles and absorbs the splash, thus preventing the escape of the lubricant. Such lubricant as is caught and absorbed by the seal 39 may be thrown out again by centrifugal action and returned to the effective zone.

In any coupling of this general type it is sometimes desirable to provide means for limiting the torque that may be transmitted in order to safeguard the connected machines or devices. Such means are generally in the form of shear pins located in the coupling flanges, that are supposed to yield to destruction after reaching a computed torque. If more than one such pin is used, it is difficult to secure simultaneous action of all. But even though only one is used, progressive failure is often experienced starting with loads much lower than the ultimate at which the coupling has been designed to release. When such loads have been imposed on the coupling several times, it may release at an indeterminate load anywhere below the desired limit.

In accordance with the present invention the limitation of the torque may be secured in a simple and efficient manner. The lock ring 18 may be changed into a shear ring 40 (Fig. 3) suitably grooved at its mid-portion to reduce the modulus of section to such an extent that it may shear or yield to destruction at any prefixed torque.

Figure 17:
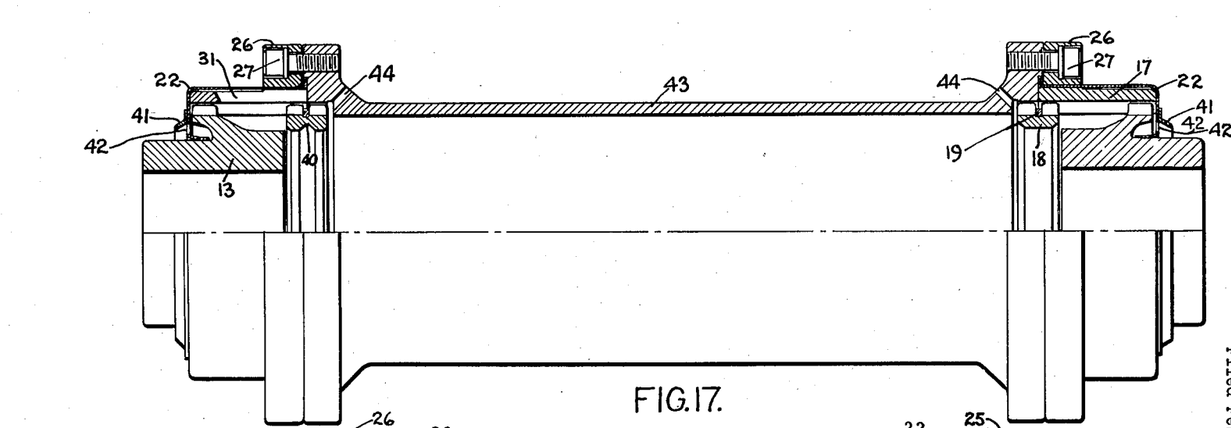
Fig. 17 is a view partly in longitudinal section and partly in elevation of a modification involving a combined arrangement of standard coupling parts, according to this invention, and an intermediate spool having splines for transmission of the torque.

While a complete self-aligning coupling unit of the standard double engagement type has been described, parts of it may be combined with rigid types of couplings to form desirable combinations for special purposes. Fig. 17 illustrates a very high speed type of coupling having continuous lubrication. Lubricant is supplied to the centrifugal collector lips 41 from any suitable source and enters the casing 22 through holes 42. After traversing the load-carrying surfaces and the splines or teeth of either the lock ring 18 or shear ring 40, it is discharged from the spool 43 through holes 44. The spool separating the coupling halves has splines or teeth meshing with the splines or teeth of the lock or shear ring, as the case may be. Outwardly projecting flanges at the ends of the spool 43 take the place of a pair of clamping rings 25 for receiving and gripping the ends of casing members 22. With this construction, as in the first embodiment, the torque does not pass through the coupling bolts or screws 27. The snap ring 19, in this case, fits into recesses in the ends of the teeth on the sleeve 17 or 31, on the one hand, and on the spool 43, on the other hand, to position the lock or shear ring.

Figure 18:
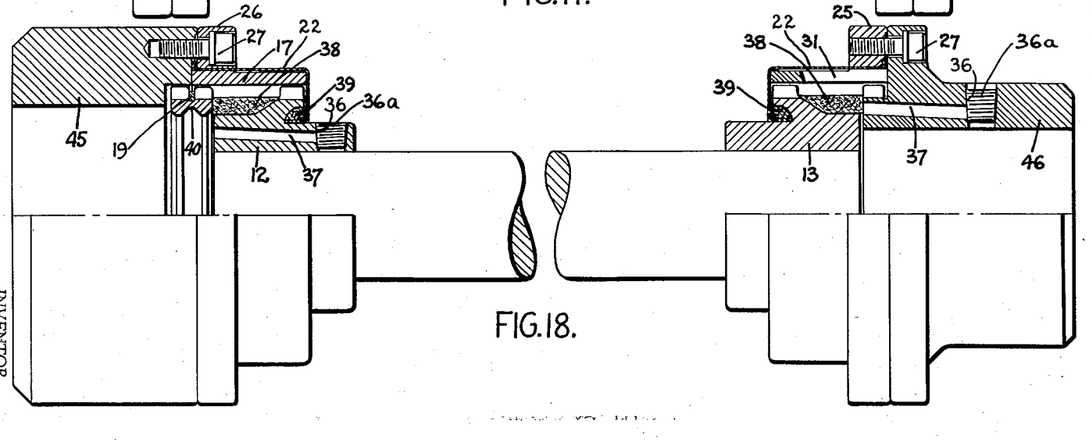
Fig. 18 is a view partly in longitudinal section and partly in elevation of a further modification involving a combined arrangement of standard coupling parts, according to this invention, and rigid coupling members furnished with splines for transmission of torque from the driving to the driven member.

Fig. 18 shows rigid members 45 and 46 forming parts of or suitably connected to the driving and driven devices and having splines or teeth for connecting the same with flexible coupling elements. A single sleeve, 17 or 31, and a single casing member 22 may be provided at each end of the assembly, these extending over and enclosing the splined portions of the hub 12 and member 45, at one end, and hub 13 and member 46, at the other end. The construction and operation of the flexible coupling elements will be apparent from the drawings and from the description of the first embodiment. A lock or shear ring may be provided at one or both ends, as shown at the left in Fig. 18, or such a ring may be omitted altogether from one or both ends, as shown at the right in Fig. 18. A complete arrangement of this character, as shown in Fig. 18, is commonly designated a floating shaft coupling and is used where greater misalignment is present than can safely be handled with the short standard type or where the driving and driven machines are necessarily located a great distance apart. Each half of the arrangement shown in Fig. 18 may be used as an individual coupling unit and this is particularly advantageous where one of the shafts to be connected is considerably larger than the other as the rigid half member may be safely furnished with a large bore.

As in all the previous arrangements shown, no torque load passes through the coupling bolts.

While coupling units embodying the invention and various modifications of certain features of the invention have been described in considerable detail, it will be understood that numerous other modifications may be made in the construction and arrangement of the several parts without departing from the general principles and scope of the invention. The terms and expressions employed herein have been used as terms of description and not of limitation.

What I claim is:

1. In a device of the class described, two rotary members, and means for transmitting a torque from one of said members to the other, said means comprising a sleeve connected in driving relation with each of said members, said sleeve having formations in engagement with formations on one of said members for the transmission of a torque therebetween, said formations having sufficiently sloping engagement surfaces to impart a radial force component to said sleeve in the transmission of torque, and said sleeve having a relatively thin wall in the region of said formations so as to render the same radially flexible and capable of deformation in cross section to effect adjustment of its formations in relation to those of said member in response to said radial component for the purpose of effecting better distribution of the load over the load carrying surfaces of said formations when the rotary members are misaligned.

2. In a device of the class described, two rotatable members, and means for transmitting a torque from one of said members to the other comprising a sleeve concentric with a portion of at least one of said members and a separate element connected in driving relation between said sleeve and the other of said members, said sleeve and said one of said members having interengaging load carrying surfaces which slope sufficiently to impart a radial force component to said sleeve in the transmission of torque, said sleeve having a relatively thin wall in the region of said surfaces which renders the same radially flexible and capable of deformation in cross section to effect adjustment of its load carrying surfaces in relation to those of said one of the members in response to said radial force for the purpose of effecting better contact between the load carrying surfaces when said members are misaligned.

3. In a device of the class described, two rotatable members, a plurality of sleeves for transmitting a torque from one of said members to the other, said sleeves encircling portions of said members and having load-carrying surfaces cooperating therewith, said surfaces having a sufficient slope to impart radial force components to said sleeve in the transmission of torque, and means connected in driving relation between said sleeves for transmitting the torque therebetween, each of said sleeves having a relatively thin wall in the region of said surfaces which renders the same radially flexible and capable of deformation in cross section to effect adjustment of its load carrying surfaces in relation to those of the associated member in response to said radial component for the purpose of effecting better contact between the load carrying surfaces when said members are misaligned.

4. In a device of the class described, two rotatable members, a sleeve encircling a portion of at least one of said members for transmission of torque between said members, and driving means co-acting between said sleeve and at least one of said members comprising projections having a pressure angle of about 20 to 30 degrees, said sleeve being sufficiently thin in the region of said projections to render the sleeve radially flexible in said region and distortable in cross section in response to the transmission of a normal torque.

5. In a device of the class described, two rotatable members, and means for coupling the same comprising a sleeve encircling a portion of one of said members, and inter-engaging driving means between said sleeve and said member having sufficiently sloping engagement surfaces to impart a radial force component to said sleeve in the transmission of a torque, said sleeve being relatively thin in the region of said driving means so as to render the same radially flexible, said driving means having radial clearance sufficient to allow said sleeve to radially adjust itself and modify its cross section in response to the transmission of torque to effect better contact between the load carrying surfaces of said driving means when said members are misaligned.

6. In a device of the class described, two rotatable members, and a sleeve connected in driving relation with each of said members for transmitting a torque therebetween, said sleeve and one of said members having freely engaging load transmitting surfaces which slope sufficiently to impart a radial force component to said sleeve in the transmission of torque, said sleeve being relatively thin in the region of said load transmitting surfaces so as to be radially flexible and being slotted to render the same torsionally elastic.

7. In a device of the class described, two rotatable members, and a plurality of interlocked sleeves, each connected in driving relation with one of said members through interengaging projections and recesses for transmitting a torque therebetween, said projections and recesses having load transmitting surfaces which slope sufficiently to impart a radial force component to said sleeve in the transmission of torque, said sleeves being relatively thin in the region of said projections and recesses to render the same radially flexible and being slotted to render the same torsionally elastic.

8. In a device of the class described, two rotatable members, a sleeve arranged to transmit a torque between said members, and driving means between said sleeve and one of said members having load transmitting surfaces which slope sufficiently to impart a radial force component to said sleeve in the transmission of torque, said driving means having radial clearance to permit radial adjustment of said sleeve in transmitting a torque to effect better contact between the load carrying surfaces, said sleeve being relatively thin in the region of said load transmitting surfaces to render the same radially flexible and being slotted to render the same also torsionally elastic to cushion shock loads.

9. In a device of the class described, two rotatable members, a radially flexible sleeve substantially concentric with a portion of one of said members, freely interengaging driving means on said sleeve and said one member, said driving means having sufficiently sloping engagement surfaces to impart to said sleeve a force having a radial component in the transmission of torque, said sleeve being relatively thin in the region of said driving means and capable of deformation in cross section in response to said radial component, the interengagement between said means on the sleeve and member being improved as the load increases due to said radial flexibility of said sleeve, and means for connecting said sleeve to the other member.

10. In a device of the class described, two rotatable members, a radially flexible and torsionally elastic sleeve encircling a portion of one of said members, freely inter-engaging driving means between said sleeve and said one member, said driving means having sufficiently sloping engagement surfaces to impart to said sleeve a force having a radial component in the transmission of torque, said sleeve being relatively thin in the region of said driving means and capable of deformation in cross section in response to said radial component, the interengagement between said means on the sleeve and member being improved as the load increases due to said radial flexibility of said sleeve, and means for connecting said sleeve to the other member.

11. In a device of the class described, two rotatable members, a sleeve encircling a portion of one of said members, inter-engaging driving means between said sleeve and said one member, and splined torque limiting means for connecting said sleeve to the other member.

12. In a device of the class described, two rotatable members, a plurality of sleeves each encircling a portion of one of said members, driving means between each sleeve and its related member, and splined torque limiting means for connecting said sleeves.

13. In a device of the class described, two rotatable members, means including a radially flexible sleeve for coupling said members, said members and sleeve having freely interengaging, non-radial load transmitting surfaces associated therewith, said surfaces sloping sufficiently to impart a radial force component to said sleeve in transmission of torque, said sleeve being relatively thin in the region of said surfaces and capable of deformation in cross section in response to said radial component, and a casing surrounding said sleeve for retaining a lubricant around said load transmitting surfaces, said casing being shiftable relative to said sleeve.

14. In a device of the class described, two rotatable members, means including a laterally flexible sleeve for coupling said members, said members and sleeve having cooperating load transmitting surfaces associated therewith, and a casing surrounding said sleeve for retaining a lubricant around said load transmitting surfaces, said casing having only a portion thereof in frictional contact with said sleeve in order to provide clearance for the major portion of said sleeve to enable it to adjust itself readily relative to said members and casing.

15. In a device of the class described, two rotatable members, means including a pair of sleeves for coupling said members, said members and sleeves having cooperating load transmitting surfaces associated therewith, and a casing surrounding said sleeves for retaining a lubricant around said load transmitting surfaces, said casing being rotatable relative to said sleeves but having frictional engagement therewith, said casing due to its frictional engagement with the coupling means acting as a torsional vibration damper for the system.

16. In a device of the class described, two rotatable members, means including a sleeve for coupling said members, said members and sleeve having cooperating load transmitting surfaces associated therewith, and a casing surrounding said sleeve for retaining a lubricant around said load transmitting surfaces, said casing being rotatable relative to said sleeve but having frictional engagement therewith, said casing due to its frictional engagement with the coupling means acting as a torsional vibration damper for the system, readily interchangeable rings carried by said casing by which its frictional rotational resistance in relation to the coupling means may be varied at will to suit the amplitude and frequency of the torsional vibrations of the system to be damped.

17. In a device of the class described, two rotating members, driving means therebetween, a lubricant holding casing enclosing portions of said members and said means, at least one of said means extending through an opening in said casing, and absorbent means in said casing radially within said driving means and radially outward of said opening arranged to increase the effective lubricant capacity of said casing.

18. In a device of the class described, two rotating members, means for transmitting torque between said members, said means including a sleeve and driving connections therefrom to said members, a casing surrounding said sleeve and portions of said members, and absorbent means between said members and said sleeve arranged to increase the effective lubricant capacity of said casing.

19. In a shaft coupling having surfaces requiring lubrication, a revolvable housing, and an absorbent lubricant reservoir within said housing disposed at least in part radially inwardly of said surfaces and adapted to discharge its contents under the influence of centrifugal force when the housing is rotated and adapted to reabsorb said lubricant when the housing is at rest.

20. In a device of the class described, two rotatable members, means for transmitting a torque between said members, said means comprising a plurality of sleeves and driving means connecting said sleeves with said members, a lubricant-holding casing encircling said sleeve and members, and a dust and lubricant seal comprising absorbent means placed between the ends of the casing and recesses in said members, said recesses being defined by inner and outer circumferential surfaces and a connecting radially extending surface, the ends of the casing being turned into said recesses radially inward of the packing and being arranged to provide flexible metallic seals engaging said members substantially in the median planes through the driving connections between said sleeves and members.

21. In a device of the class described, two rotatable members, torque transmitting means connecting the same, a lubricant-holding casing encircling said members, means for supporting said casing and forming metallic seals between the casing and said members, and a fabric seal between the casing and said members for assisting in retaining the lubricant and excluding dirt.

22. In a device of the class described, two rotatable members, an intermediate member, means for coupling all three of said members comprising a sleeve at least partly encircling one of said rotatable members and said intermediate member but terminating in a plane passing through the latter, splines forming driving connections between said sleeve and members, means comprising splines connecting the other of said rotatable members with said intermediate member the construction and arrangement being such that torque is transmitted between separate elements of the coupling only through said splined connections, and a lubricant-holding casing at least partly encircling said sleeve and members.

23. In a device of the class described, a plurality of rotatable members adapted to have their axes out of direct alignment, and a coupling for said members comprising a rotatable casing carried directly by said members and means comprising at least two parts within said casing rotatable relative thereto for transmitting torque between said members independently of the casing, each of said parts being less than half the length of said casing, said means and members having intermeshing projections and depressions.

24. In a device of the class described a pair of spaced rotatable members to be connected, and means for coupling said members comprising a pair of radially flexible sleeves, one substantially concentric with the axis of each of said members, toothed means for connecting each of said sleeves with its related member and arranged to impart forces having radial components to said sleeves, a hollow spool extending between said members, toothed means for connecting said sleeves with said spool, and casing members secured to said spool and extending over said sleeves to enclose the same.

25. In a gear type coupling a driving shaft, a driven shaft, means for transmitting a torque between said shafts including a sleeve, a toothed member on one of said shafts cooperating with teeth on said sleeve, said cooperating teeth having bottom clearance and being formed with tapered flanks to develop a radial thrust against the sleeve, said sleeve being sufficiently thin in the region of said teeth and being formed of such material as to be capable of deformation in cross section in response to said radial thrust and oil retaining means surrounding the toothed portion of the sleeve, said oil retaining means having sufficient clearance from said toothed portion of the sleeve to permit said deformation of the latter under said radial thrusts.

26. In a device of the class described, a plurality of telescoping annular members connected for transmission of a torque from one to another while angularly misaligned, said means having interengaging toothed portions normally circular in cross section, the teeth of said members having oblique contact areas with a pressure angle greater than the angle of repose, and at least one of said members being sufficiently thin to be radially flexible in the region of their mutual engagement to permit changing of the normally circular section thereof to an elliptic section by the action of the radial components of the forces transmitted between the oblique contact areas of the teeth first in contact, for the purpose of effecting engagement of all the teeth and thereby securing better load distribution.

GUSTAVE FAST.